United States Patent Office 3,382,242
Patented May 7, 1968

3,382,242
DIBENZOCYCLOOCTENES
Albert J. Frey, Essex Fells, and Eugene E. Galantay, Morristown, N.J., assignors to Sandoz Inc., Hanover, N.J.
No Drawing. Continuation-in-part of application Ser. No. 378,931, June 29, 1964. This application Apr. 8, 1966, Ser. No. 541,104
10 Claims. (Cl. 260—247)

This is a continuation-in-part of application Serial No. 378,931, filed June 29, 1964, now abandoned.

The present invention is directed to pharmaceutically acceptable and therapeutically useful 2 - amino - 1,2,6, 7,8,12b - hexahydrocyclopenta[d,e] - dibenzo[a,d] cyclooctenes, particularly compounds of the formula

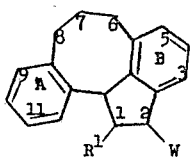

wherein
$R^1$ is either a hydrogen atom (—H) or lower alkyl, e.g. methyl, ethyl, propyl, isopropyl and butyl;
W is either

e.g. primary amino (—NH$_2$), secondary amino, such as $\beta$ - phenethylamino and isopropylamino; and tertiary amino, such as N - methyl - N - propylamino; or heteromonocyclic amino, an amino nitrogen of which is a ring nitrogen atom bonded directly to the 2 - carbon of compound (I), e.g. piperidyl, morpholyl, and N - ethylpiperazyl;
each of $R^2$ and $R^3$ is, independently, either a hydrogen atom (—H); lower alkyl, e.g. methyl, ethyl, isopropyl, propyl, and butyl; ar(lower)alkyl, e.g. benzyl and $\beta$ - phenethyl; (lower)alkylamino(lower)alkyl, e.g. diethylaminoethyl and methylaminopropyl; hydroxy(lower)alkyl, e.g. $\beta$ - hydroxyethyl; allyl or propargyl;
ring A is either unsubstituted or substituted in at least one of the positions 9, 10 and 11 with at least one substituent, such as lower alkoxy, e.g. methoxy, ethoxy, propoxy, isopropoxy and butoxy; a halogen atom, e.g. chlorine (—Cl) and fluorine (—F); and trifluoromethyl (—CF$_3$); and
ring B is either unsubstituted or substituted in at least one of the positions 3, 4 and 5 with at least one substituent, such as lower alkoxy, e.g. methoxy, ethoxy, propoxy, isopropoxy and butoxy; a halogen atom, e.g. chlorine (—Cl) and fluorine (—F); and trifluoromethyl (—CF$_3$);
pharmaceutically acceptable acid addition salts thereof and intermediates in the preparation thereof.

In view of the fact that compounds (I), in all cases where $R^1$ is different from hydrogen, have at least three asymmetric carbon atoms, there are at least eight stereoisomeric forms of each compound (I). In cases where $R^1$ is hydrogen, there are at least 2 asymmetric carbon atoms, and, thus, at least four stereoisomeric forms of each compound (I). In view of the fact that compounds (I), as well as some of the intermediates leading to them, contain a number ($n$) of asymmetric carbon atoms, there are $2^n$ stereoisomeric forms of each such compound. All of these stereoisomeric forms are within the scope of the invention, even though some of the stereoisomeric pairs are preferentially formed in the reactions described under "Examples." As desired, single stereoisomers of the products (I) or those of the intermediates can be isolated by methods known to the art-skilled. Thus, the so-called geometrical isomers or diastereoisomers can be separated from each other by, e.g. fractional crystallization, whereas single "racemates" can be split into the optical enantiomers by the process known as "resolution."

Among the pharmaceutically acceptable acid addition salts are salts of organic acids, e.g. tartaric acid, inorganic acids, e.g. hydrochloric acid; monobasic acids, e.g. hydrobromic acid and an alkanesulfonic acid, such as methane sulfonic acid (H$_3$C—SO$_3$H); dibasic acids, e.g. sulfuric acid and succinic acid; tribasic acids, e.g. phosphoric acid and citric acid; saturated acids, e.g. acetic acid; ethylenically unsaturated acids, e.g. maleic acid and fumaric acid; and aromatic acids, e.g. salicyclic acid and arylsulfonic acids, such as benzenesulfonic acid. The only limitation on the acid selected is that the resulting acid addition salt be pharmaceutically acceptable; the acid does not nullify the therapeutic properties of compounds I. An acid addition salt is prepared from its corresponding free base in a manner well known to the art-skilled.

Compounds I and their pharmaceutically acceptable acid addition salts are useful as analgesics. They may be administered either orally or parenterally in standard dosage forms, e.g. tablets and capsules. The average daily dosage varies, but is ordinarily within the range from 30 milligrams to 200 milligrams.

Each of the pharmaceutically active compounds of this invention, may be, e.g. incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compound is:

| | Parts |
|---|---|
| Title compound of Example 17 | 30 |
| Tragacanth | 2 |
| Lactose | 59.5 |
| Corn starch | 5 |
| Talcum | 3 |
| Magnesium stearate | 0.5 |
| Alcohol SD–30, q.s. | |
| Purified water, q.s. | |

Starting material II, for the preparation of compounds I bearing no ring substituents and the corresponding intermediates, is 10,11-dihydro-5H-dibenzo[a,d]cycloocten-5-one, which is known. Corresponding ring-substituted starting materials are prepared according to standard procedures well-known to the art-skilled. The substituents are unaffected by the reactions leading from the starting material II to the final product I.

The relationship between starting materials II, intermediates and final products I is reflected in the following flow sheet wherein the compounds are designated by roman numerals and the reactions by capital letters.

Reaction A is a condensation of II with tertiary-butyl acetate in the presence of diethylamino magnesium bromide, following the general method of K. Sisido, H. Nozaki and O. Kurihara, JACS, 74 6254 (1952), in diethylether, tetrahydrofuran or dioxane as solvent.

Reaction B is the Reformatsky reaction with $$R^1\text{---CH---CO---O---}R^4$$
$$|$$
$$\text{Hal}$$

wherein

R[1] is either a hydrogen atom (—H); or lower alkyl, e.g. methyl, ethyl, propyl, isopropyl and butyl;

R[4] is lower alkyl, e.g. methyl, ethyl, propyl, isopropyl and butyl; and followed by rearrangement and saponification of the initial product

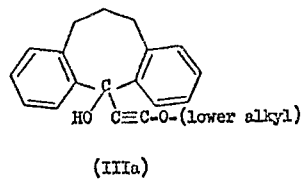

(IIIa)

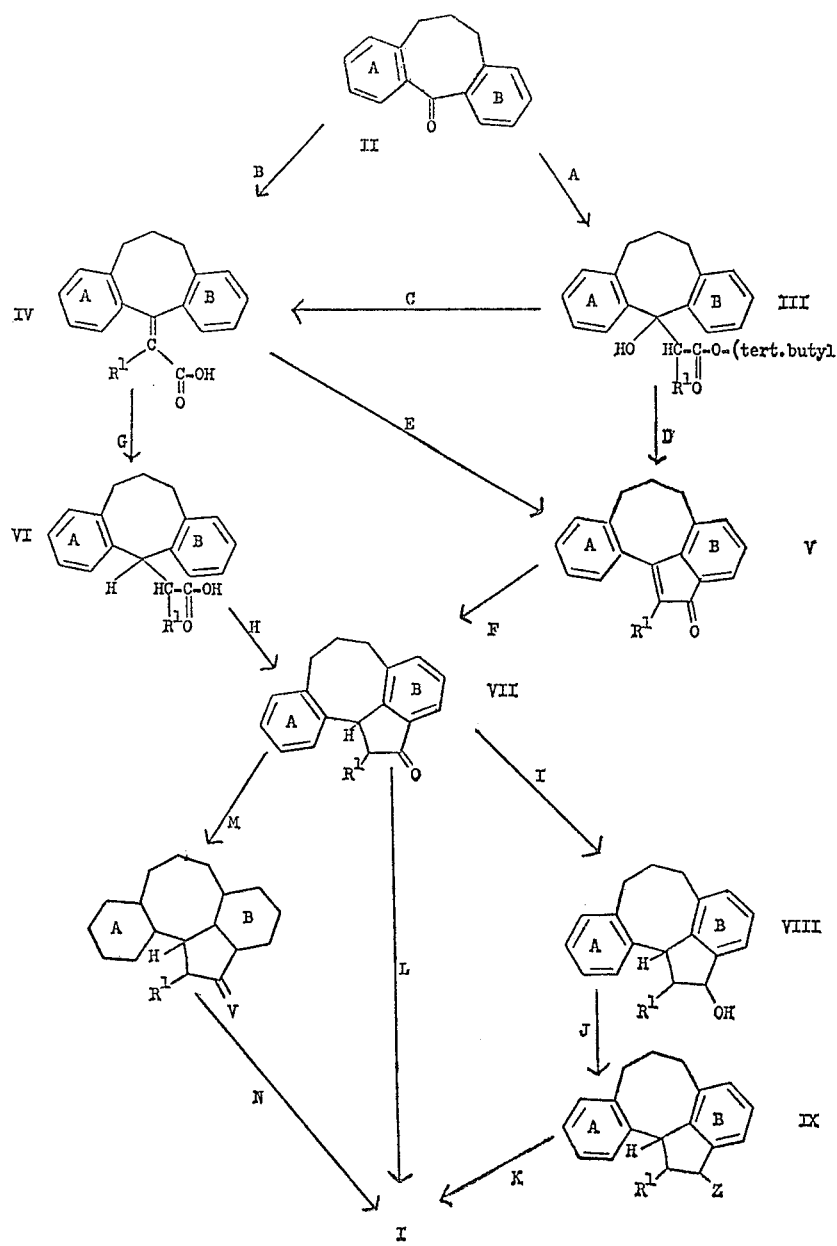

Hal is preferably a bromine atom (—Br), but may be either a chlorine atom (—Cl) or an iodine atom (—I); followed by saponification and dehydration.

Reaction B is alternatively effected with a (lower alkoxy) acetylene [e.g. methoxy acetylene, proproxyacetylene and butoxyacetylene, but preferably ethoxyacetylene],

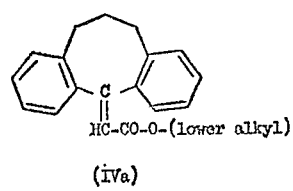

(IVa)

according to the general method described by G. F. Arens, "Advances in Organic Chemistry," volume II, pp. 157 to 161, Interscience Publishers, Inc., New York, N.Y., 1960.

Reaction C takes place in an inert solvent, such as benzene, toluene and xylene, at the boiling point of the reaction system in the presence of an acid catalyst, preferably para-toluenesulfonic acid, and advantageously in apparatus which permits azeotropic removal of water formed during the reaction.

Reactions D and E (cyclization) are best effected with a mixture of polyphosphoric acid and acetic acid, preferably with a 1:10 mixture, i.e. one part by volume of polyphosphoric acid with an 82% to 84% $P_2O_5$ content dissolved in ten parts by volume of glacial acetic acid, but mixtures with ratios from 1:1000 to 1:3 are useful for this purpose. At least one half mole of $P_2O_5$ for each mole of IV and 1.0 mole of $P_2O_5$ for each mole of III are advantageously employed. Reactions D and E are carried out at from 50° to 150° C., preferably in the range of from 100° to 120° C.

When other cyclization reagents are employed in reactions D and E, side products may be formed to a greater extent and/or the desired product may undergo further reactions, e.g. dimerization and condensation.

Reactions F and G are either chemical reductions or standard hydrogenations (preferred) at pressures from 1 to 500 atmospheres and temperatures from 0° to 150° C. in a solvent, such as dioxane, ethanol and ethyl acetate, preferably with palladium catalyst.

Reaction H (cyclization) is carried out preferably with polyphosphoric acid at a temperature from 40° to 200° C., but other methods, e.g. cyclization in liquid anhydrous hydrofluoric acid of Friedel-Crafts cyclization of the corresponding chloride, may also be used.

Reaction I is a reduction according to standard procedures. While reduction with lithium aluminum hydride is preferred, other complex hydrides, such as sodium and lithium borohydride, or other reduction methods, such as the Meerwein-Ponndorf reduction or catalytic hydrogenation, may alternatively be employed.

In compound IX Z is either a chlorine atom (—Cl), i.e. reaction J is with thionyl chloride; a bromine atom (—Br), i.e. reaction J is with hydrogen bromide in benzene; an iodine atom (—I), i.e. reaction J with hydriodic acid; mesyloxy (—$OSO_2CH_3$), i.e. reaction J is with mesyl chloride; or tosyloxy (—$OSO_2C_6H_4CH_3$), i.e. reaction J is with tosyl chloride. The reaction with hydrogen bromide in benzene at a temperature from 4° to 30° C. is preferred.

Reaction K is with an amine, W–H, wherein W has its above-ascribed meaning. Depending upon the nature of the amine, i.e. whether it is a primary or secondary amine, its volatility, its solubility, etc., different methods (e.g. methods A, B and C or Examples 11, 12 and 13, respectively) are employed in effecting this reaction. Thus, when the amine is volatile, e.g. dimethylamine, it is advantageous to employ a pressure in excess of one atmosphere and more than two moles of amine per mole of IX. When the amine is primary (either $R^2$ or $R^3$ is a hydrogen atom), an excess thereof is used to minimize side products. Reaction temperatures, pressures and solvents depend, to some extent, on the nature of the amine, but temperatures from 20° to 200° C., pressures from 0.2 to 100 atmospheres and inert solvents, such as dioxane and benzene, are operative.

After the completion of the reaction it is often advantageous to admix with the reaction product one mole of strong inorganic base, e.g. sodium hydroxide, to liberate the free base of said reaction product and/or the starting amine from its salt with the acid, Z–H.

Separation and recovery of the unreacted starting amine is effected by distillation, vacuum- or steam-distillation or extraction with water of a, e.g., benzene solution of the reaction product. After elimination of the unreacted starting amine, W–H, the product is advantageously isolated and purified by the preparation and recrystallization of its pharmaceutically acceptable acid addition salts, e.g. hydrochloride, fumurate, methane sulfonate and salicylate, themselves objects of this invention.

Reaction L is a hydrogenation (preferably catalytic) in the presence of an amine, W–H. The hydrogenation is preferably effected with Raney nickel as the catalyst at a pressure from 1 to 500 atmospheres, at a temperature from 20 to 200° C. and in a solvent, such as ethanol and dioxane.

Reaction M is a condensation of VII with a compound $H_2V$, wherein

V is either =N—$R^5$, =N—OH or =N—O—(lower alkyl); and $R^5$ is either lower alkyl, e.g. methyl, ethyl, propyl, isopropyl and butyl; ar(lower)alkyl, e.g. benzyl and $\beta$-phenethyl; or (lower)alkylamino(lower)alkyl, e.g. diethylaminoethyl and methylaminopropyl.

When the compound is $H_2NR^5$, the condensation is best carried out by heating VII with the primary amine $H_2NR^5$, preferably in admixture with an acid catalyst (e.g. para-toluenesulfonic acid and zinc chloride) in an inert solvent, such as benzene, toluene and ortho-dichlorobenzene, at a temperature from 50° to 200° C. and, preferably, in apparatus which permits simultaneous removal of water formed during the reaction. When the compound is either $H_2H$—OH or $H_2N$—O—(lower alkyl), condensation is effected by heating VII with said compound (or acid addition salts, e.g. hydrochloride and acetate, thereof) in a solvent, such as ethanol and pyridine, at a temperature from 30° to 200° C.

Reaction N is a reduction of X to I. It is either a chemical reduction with, e.g., a complex hydride, such as lithium aluminum hydride and sodium borohydride; sodium amalgam; and zinc; or a catalytic hydrogenation.

Reaction O is either a chemical reduction with a complex hydride (as exemplified for reaction N) or it is a catalytic hydrogenation.

Compounds VII, wherein $R^1$ is a hydrogen atom, are alkylated in the 1-position to obtain corresponding compounds wherein $R^1$ is lower alkyl. Such alkylations are, preferably, carried out by adding one mole of a strong base, e.g. sodium hydroxide and potassium tertiary-butoxide, to one mole of VII dissolved in a solvent, such as toluene, dimethylformamide and dimethylsulfoxide, to form the anion of VII to which (lower alkyl)—Z is added. A compound VII, wherein $R^1$ is lower alkyl, is thus prepared.

It is also possible to prepare compound I, wherein W is —$NH_2$, and alkylate (or reductively alkylate) to obtain corresponding compounds wherein $R^2$ and $R^3$ are other than hydrogen atoms. (See method F.)

When, in the above series of reactions, starting compounds II having a non-symmetric substitution pattern on rings A and B, i.e. starting materials II devoid of a two-fold symmetry axis, are used, reactions B and C can (and, in most cases do) lead to two geometric (cis and trans) isomers of intermediate IV, which can be separated by, e.g., fractional crystallization. Both geometrical isomers IV can be used to effect the ring closure of reaction E. For a single geometric isomer IV, ring closure is effected toward that benzene ring (A or B) which is closer in space to the carboxylic group. Thus, a cis-trans pair IV will give rise, in reaction E, to two chemical (substitution) isomers V. These are separated by usual methods, e.g. by fractional recrystallization, and used in the subsequent steps leading to final products I.

If, however, starting material II with a non-symmetric substitution pattern on rings A and B is to be used, it is often preferred to proceed via steps A, C, G, H or B, G, H to intermediate VII. In such case separation of the cis- and trans-isomers of IV is avoided since, from reaction G, only one compound VI is formed. The preferential direction of the ring closure H is dependent on the relative activation, by substituents on rings A and B, toward such ring closure. Of the indicated possible substituents, halogen atoms and trifluoromethyl groups are ring-closure deactivating substituents; whereas, lower alkoxy groups are ring-closure activating substituents.

When cyclization H is employed, the ring closure is toward that ring which is less deactivated (more activated) when the substitution is asymmetric. It is possible, however, to obtain ring closure with respect to the more deactivated ring when reactions E and F are employed. In either case, it is preferable that one of the two benzene rings with which cyclization occurs contains at most one ring-closure deactivating substituent; whereas, the other may contain such substituents in any number of the available positions.

The following examples are merely illustrative. Reactions wherein the benzene nuclei are either unsubstituted or are specifically substituted are illustrative of corresponding reactions wherein said nuclei are any of those within the scope contemplated by this invention, unless otherwise indicated.

In each of the examples the parts and percentages are by weight unless otherwise specified. The temperatures are in degrees centigrade. The relationship between parts by weight and parts by volume is the same as that between the kilogram and the liter.

EXAMPLE 1

1-methyl-2,6,7,8-tetrahydrocyclopenta[d,e]dibenzo[a,d]cycloocten-2-one

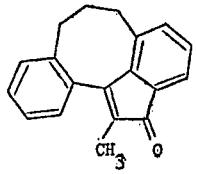

React 44.4 parts of 5,10,11,12-tetrahydrodibenzo[a,d]-cycloocten-5-one and 60 parts of ethyl-α-bromopropionate under the conditions known as the Reformatsky Reaction," and hydrolyze the resulting crude product with ethanolic sodium hydroxide to obtain, after acidification, 5-(1'-carboxy-1'-ethylidene) - 5,10,11,12 - tetrahydrodibenzo[a,d]cyclooctene. Admix 44.8 parts of the foregoing compound with 40 parts of polyphosphoric acid in 400 parts of glacial acetic acid and maintain the resulting solution at 100° for 15 hours. Pour the reaction mixture onto ice and take up the resulting orange precipitate in chloroform. Wash the obtained chloroform solution with 2 N sodium hydroxide solution to separate 5-(1'-carboxy-1'-ethylidene) - 5,10,11,12 - tetrahydrodibenzo[a,d]cyclooctene; then evaporate the chloroform solution to obtain the title compound. Purify by chromatography on silica gel.

EXAMPLE 2

5-carboxymethyl-5,10,11,12-tetrahydrodibenzo[a,d]cyclooctene

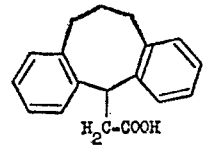

Shake a suspension of 10.6 parts of 5-carboxymethylidene-10,11-dihydro-5H - dibenzo[a,d]cyclooctene in 100 parts of dioxane with 0.85 parts of palladium-charcoal (10%) catalyst at 50° to 55° in a hydrogen atmosphere of 50 atmospheres until one mole of hydrogen is taken up. Filter the resultant mixture and extract the catalyst with boiling chloroform. Evaporate the filtrate and extracts to obtain the title compound, M.P. 205° to 206°.

EXAMPLE 3

2-chloro-5-(1'-carboxy-1'-ethylidene)-5,10,11,12-tetrahydrodibenzo[a,d]cyclooctene

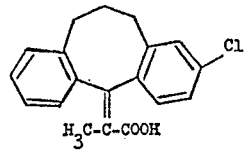

React 53 parts of 2-chloro - 5,10,11,12 - tetrahydrodibenzo[a,d]cycloocten-5-one with 55 parts of ethyl-α-bromopropionate under the conditions generally known as the Reformatsky Reaction. Saponify the crude product by refluxing it with alcoholic potassium hydroxide and acidify to obtain crude title compound which is used without further purification in the following example.

EXAMPLE 4

2-chloro-5-(1'-carboxyethyl)-5,10,11,12-tetrahydrodibenzo[a,d]cyclooctene

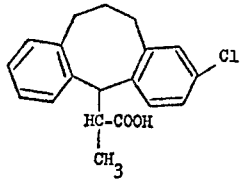

Reflux for 16 hours a mixture of 43 parts of crude 2-chloro - 5 - (1' - carboxy - 1' - ethylidene) - 5,10,11,12-tetrahydrodibenzo[a,d]cyclooctene, 20 parts of red phosphorus, and 160 parts of 57% hydriodic acid. Cool, pour the reaction mixture onto ice, filter and wash the insoluble product. Reflux the resultant product with concentrated ammonium hydroxide. Filter the ammonium hydroxide solution and acidify with dilute hydrochloric acid to pH 1. The title compound separates as a solid.

EXAMPLE 5

5-carboxymethylidene-5,10,11,12-tetrahydrodibenzo[a,d]cyclooctene

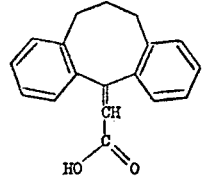

React 5,10,11,12-tetrahydrodibenzo[a,d]cycloocten-5-one, M.P. 148°, [Stach, K., and Spingler, H., "Monatshefte fur Chemie," 93, 889 (1962)] with lithium-ethoxyacetylene and rearrange the obtained reaction product by the method of G. F. Arens, supra. Saponify the thus-obtained ethyl ester of the title compound with ethanolic potassium hydroxide to obtain the title compound, M.P. 170° to 172°.

EXAMPLE 6

2,6,7,8-tetrahydrocyclopenta[d,e]dibenzo[a,d]cycloocten-2-one

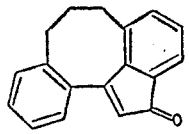

Admix 43 parts of 5-carboxymethylidene-5,10,11,12-tetrahydrodibenzo[a,d]cyclooctene (see Example 5) with 60 parts of polyphosphoric acid in 600 parts of glacial acetic acid and reflux the resulting solution for 30 minutes. Pour the reaction mixture onto ice, and dissolve the resulting orange precipitate in chloroform. Wash the obtained chloroform solution with 2N sodium hydroxide solution to separate any unreacted 5-carboxymethylidene-5,10,11,12-tetrahydrodibenzo[a,d]cyclooctene; then evaporate the remaining chloroform solution to obtain 38 parts of the crude title compound. Purify by chromatography on silica gel to separate the compound of this example from 5-methylidene-5,10,11,12-tetrahydrodibenzo-[a,d]-cyclooctene.

EXAMPLE 7

1,2,6,7,8,12b-hexahydrocyclopenta[d,e]dibenzo[a,d]-cycloocten-2-one

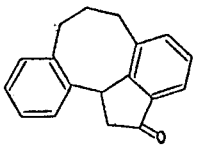

Shake 15.0 parts of 2,6,7,8,-tetrahydrocyclopenta[d,e]-dibenzo[a,d]cycloocten-2-one, dissolved in 200 parts of ethyl acetate, with 2.0 parts of palladium-charcoal (5%) catalyst in a hydrogen atmosphere until the hydrogen consumption ceases. Filter the resultant mixture and extract the catalyst with boiling chloroform. Evaporate the filtrate and extracts. Crystallize the residue to obtain 1,2,6,7,8,12b - hexahydrocyclopenta[d,e]dibenzo[a,d]cyclo-octen-2-one, M.P. 102° to 104°.

EXAMPLE 8

1,2,6,7,8,12b-hexahydrocyclopenta[d,e]dibenzo[a,d]-cycloocten-2-one

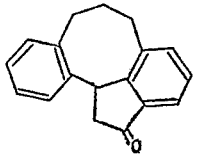

To 1600 parts of commercial polyphosphoric acid ($P_2O_5$ content of 82% to 84%) vigorously stirred at 92° add, in one portion, 17 parts of 5-carboxymethyl-5,10,11,12-tetrahydrodibenzo[a,d]cyclooctene and maintain stirring between 140° and 150° for 20 minutes. Pour the produced mixture onto 4000 parts of ice, filter and wash separated solids with 2N sodium carbonate solution to remove unchanged starting material. Rewash said solids with water, ethanol and diethylether. Recrystallize the thus-washed solids to obtain the pure title compound, M.P. 102° to 104°. Recover unchanged starting material from soda and aqueous washings by acidification.

EXAMPLE 9

1-methyl-10-chloro-1,2,6,7,8,12b-hexahydrocyclopenta-[d,e]dibenzo[a,d]cycloocten-2-one

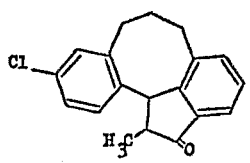

Heat a mixture of 10.8 parts of 2-chloro-5-(1'-carboxyethyl)-5,10,11,12-tetrahydrodibenzo[a,d]cyclooctene and 100 parts of polyphosphoric acid at 95° for 90 minutes. Pour the reaction mixture onto ice and filter to separate the crude title compound. Wash said crude product with dilute aqueous sodium hydroxide and water, and purify by recrystallization.

EXAMPLE 10

1,2,6,7,8,12b-hexahydrocyclopenta[d,e]dibenzo[a,d]cycloocten-2-ol

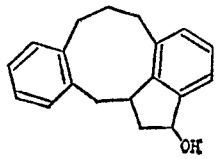

(a) Reflux for 3 hours a mixture consisting of 7.2 parts of 1,2,6,7,8,12b - hexahydrocyclopenta[d,e]dibenzo[a,d]cycloocten-2-one, 1 part of lithium aluminum hydride and 200 parts of dry diethyl ether. Decompose the excess lithium aluminum hydride with dilute sulfuric acid under cooling. Distill off ether and obtain the title compound, M.P. 112°, by filtration and recrystallization from ethanol/diethylether or benzene.

(b) Admix 0.3 part of sodium borohydride to a solution of 1.1 part of 2,6,7,8-tetrahydrocyclopenta[d,e]di-benzo[a,d]cycloocten-2-one in 20 parts of ethanol (previously cooled to −70°), and warm the obtained mixture to room temperature over a period of three hours. After two more hours at room temperature, decompose excess borohydride with aqueous acetic acid and extract resultant with chloroform to obtain (after recrystallization of the chloroform extract from benzene) the title compound, M.P. 110° to 112°.

EXAMPLE 11

1-methyl-10-chloro-1,2,6,7,8,12b-hexahydrocyclopenta[d,e]dibenzo[a,d]cycloocten-2-ol

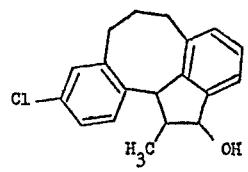

Reflux for 3 hours a mixture consisting of 7.5 parts of 1 - methyl - 10 - chloro - 1,2,6,7,8,12b - hexahydrocyclopenta[d,e]dibenzo[a,d]cycloocten-2-one, 1 part of lithium aluminum hydride and 200 parts of dry diethyl ether. Decompose the excess lithium aluminum hydride with dilute sulfuric acid under cooling. Wash, dry, and evaporate the ether layer to obtain the title compound.

EXAMPLE 12

2-bromo-1,2,6,7,8,12b-hexahydrocyclopenta[d,e]dibenzo[a,d]cyclooctene

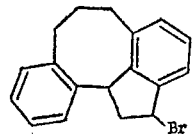

Introduce hydrogen bromide gas for 2 hours into a suspension of 6.6 parts of 1,2,6,7,8,12b-hexahydrocyclopenta[d,e]dibenzo[a,d]cycloocten-2-ol in 150 parts of benzene. Wash the thus obtained solution with ice-cold water and sodium hydrocarbonate solution and evaporate the neutral, dry benzene solution to obtain crude title compound.

EXAMPLE 13

1-methyl-2-bromo-10-chloro-1,2,6,7,8,12b-hexahydrocyclopenta[d,e]dibenzo[a,d]cyclooctene

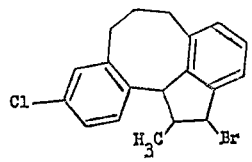

Introduce for 2 hours hydrogen bromide gas into a suspension of 7.0 parts of 1-methyl-10-chloro-1,2,6,7,8,12b - hexahydrocyclopenta[d,e]dibenzo[a,d]cycloocten-2-ol in 150 parts of benzene. Wash the thus-obtained dark solution with ice-cold water and sodium hydrocarbonate solution and evaporate the neutral, dry benzene solution to obtain the crude title compound. Purify by crystallization with diethylether petroleum ether.

EXAMPLE 14

1 - methyl - 2 - β - diethylaminoethylamino - 10 - chloro-1,2,6,7,8,12b - hexahydrocyclopenta[d,e]dibenzo[a,d]cyclooctene

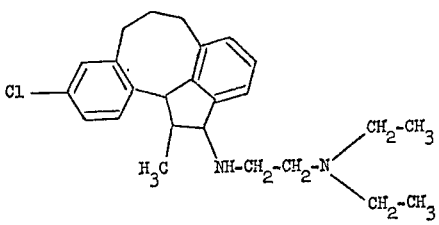

Heat a solution of 1.1 part of 1-methyl-2-bromo-10-chloro - 1,2,6,7,8,12b - hexahydrocyclopenta[d,e]dibenzo[a,d]cyclooctene and 9 parts of β-diethylaminoethylamine in 20 parts of dioxane at 80° for 12 hours. Add to the product 0.3 part of sodium hydroxide dissolved in 10 parts by volume of ethanol. Evaporate the resultant to dryness and eliminate the volatile components of the mixture in a high vacuum. Dissolve the resultant product in dry diethylether, and introduce into the dry ether solution hydrogen chloride gas to obtain 1-methyl-2-β-diethylaminoethylamino - 10 - chloro - 1,2,6,7,8,12b - hexahydrocyclopenta[d,e]dibenzo[a,d]cyclooctene dihydrochloride. The free base is liberated from the acid addition salt (the dihydrochloride) according to well-established procedures.

Replacing the 1-methyl-2-bromo-10-chloro-1,2,6,7,8,12b - hexahydrocyclopenta[d,e]dibenzo[a,d]cyclooctene with an equivalent of either 2-bromo-4,10-difluoro-1-methyl - 1,2,6,7,8,12b - hexahydrocyclopenta[d,e]dibenzo[a,d]cyclooctene or 2-bromo-9,11-dichloro - 1 - methyl - 3 - trifluoromethyl-1,2,6,7,8,12b - hexahydrocyclopenta[d,e]dibenzo[a,d]cyclooctene results in the preparation, in similar manner, of the corresponding compound I.

EXAMPLE 15

1-methyl-2-N-piperidine-1,2,6,7,8,12b-hexahydrocyclopenta[d,e]dibenzo[a,d]cyclooctene

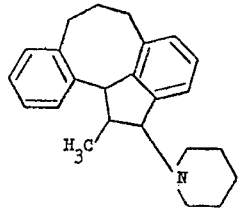

Shake a mixture of 64.5 parts of 1-methyl-1,2,6,7,8,12b-hexahydrocyclopenta[d,e]dibenzo[a,d]cycloocten-2 - one, 100 parts of piperidine, 80 parts of methanol and 20 parts of Raney nickel catalyst in a hydrogen atmosphere of 1470 p.s.i.g. and maintain the reaction temperature at 140° until hydrogen consumption ceases. Filter the reaction solution and eliminate any unchanged starting material by high vacuum distillation, followed by conversion of the residue to its hydrochloride salt. Recrystallize from wet dioxane to obtain the title compound.

Replacing the 1-methyl-1,2,6,7,8,12b-hexahydrocyclopenta[d,e]dibenzo[a,d]cycloocten-2-one with an equivalent of either 9-chloro-3,11-dimethoxy-1-methyl-1,2,6,7,8,12b-hexahydrocyclopenta[d,e]dibenzo[a,d]cycloocten - 2-one, 4-ethoxy-1-methyl-10-trifluoromethyl - 1,2,6,7,8,12b-hexahydrocyclopenta[d,e]dibenzo[a,d]cycloocten-2 - one or 11-fluoro-5-methoxy-1-methyl-1,2,6,7,8,12b-hexahydrocyclopenta[d,e]dibenzo[a,d]cycloocten-2-one results in the preparation, in similar manner, of the corresponding compound I.

EXAMPLE 16—METHOD A 2-dimethylamino-1,2,6,7,8,12b-hexahydrocyclopenta[d,e]dibenzo[a,d]cyclooctene

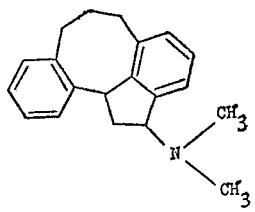

With 175 parts of dry dioxane (saturated at 0° with dimethylamine admix 22 parts of 2-bromo-1,2,6,7,8,12b - hexahydrocyclopenta[d,e]dibenzo[a,d]cyclooctene, and shake obtained mixture in a pressure apparatus (Paar) for three hours at 55°. Thereafter, evaporate the dioxane, dissolve the resulting residue in diethylether and wash the ether solution with 2N sodium hydroxide and with water.

Dry the washed ether solution over sodium sulfate, and add the dried product to a solution of excess fumaric acid in diethylether. There is thus obtained the acid fumarate of the title compound. The free base is obtained from the acid addition salt according to standard procedures for freeing a base from its acid addition salt.

Compounds I wherein rings A and B are unsubstituted, $R^1$ is a hydrogen atom and W is diethylamino and wherein rings A and B are unsubstituted, $R^1$ is a hydrogen atom and W is tertiary butylamino are prepared in similar manner from corresponding starting materials.

EXAMPLE 17

2-N-methyl-N'-piperazino-1,2,6,7,8,12b-hexahydrocyclopenta[d,e]dibenzo[a,d]cyclooctene dihydrochloride

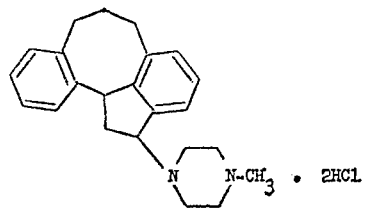

Admix a solution of 12.1 parts of 2-bromo-1,2,6,7,8,12b-hexahydrocyclopenta[d,e]dibenzo[a,d]cyclooctene in 175 parts by volume of benzene with 32 parts of N-methylpiperazine. After resulting exothermic period reflux the product for an additional three hours. Cool the obtained material, add thereto a solution of 1.6 parts of sodium hydroxide in 40 parts by volume of ethanol, and evaporate the resultant to dryness.

Heat the residue to 50° in a high vacuum to remove any retained N-methylpiperazine. Dissolve the remainder in dry diethylether, and filter the organic layer from the sodium bromide present. Introduce hydrogen chloride into the separated (ether) organic layer to obtain the title compound, melting point 225° to 230°.

Replacing the N-methylpiperazine either with an equivalent of N-β-hydroxyethylpiperazine, with an equivalent of morpholine, with an equivalent of di(β-hydroxyethyl)-amine or with an equivalent of N-β-hydroxyethyl-N'-γ-aminopropylpiperazine results in the preparation, in similar manner, of the corresponding compound I.

EXAMPLE 18—METHOD C 2-(β-phenylethylamino)-1,2,6,7,8,12b-hexahydrocyclopenta[d,e]dibenzo[a,d]cyclooctene

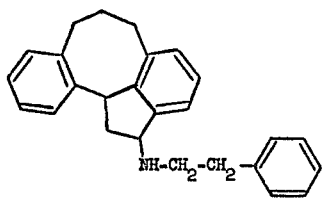

To a solution of 6.5 parts of 2-bromo-1,2,6,7,8,12b-hexahydrocyclopenta[d,e]dibenzo[a,d]cyclooctene in 100 parts by volume of benzene add 20 parts of β-phenethylamine, and reflux the resulting admixture for 12 hours.

Cool the obtained product, add thereto a solution of 1.2 parts of potassium hydroxide in 16 parts by volume of water and steam-distill the resultant until the distillate is neutral. Extract the residue with diethylether, and dry the ether extract over sodium sulfate. Introduce hydrogen chloride into the dry ether solution to obtain the hydrochloride of the title compound.

Replacing the β-phenethylamine with an equivalent of either α-methyl-β-phenethylamine, N-methyl-N-chlorobenzylamine, N-methyl-N-p-methoxybenzylamine, N-methyl-N-3,4-methylenedioxybenzylamine, N-allyl-N-benzylamine, p-chlorophenethylamine, p-methoxyphenethylamine, 3,4-dimethoxyphenethylamine, N-methyl-N-β-phenylisopropylamine, N-β-phenethyl-N-propylamine, N-methallyl-N-phenethylamine or N-penethyl-N-propargylamine results in the preparation, in similar manner, of the corresponding compound I.

EXAMPLE 19—METHOD D 2-(L-1'-hydroxy-2'-butylamino)-1,2,6,7,8,12b- hexahydrocyclopenta[d,e]dibenzo[a,d]cyclooctene

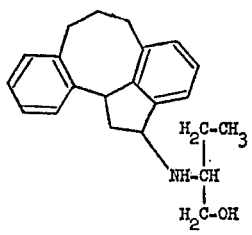

Reflux a mixture of 6.24 parts of 1,2,6,7,8,12b-hexahydrocyclopenta[d,e]dibenzo[a,d]cycloocten - 2 - one, 2.23 parts of L(+)-2-aminobutanol, 0.002 part of paratoluenesulfonic acid and 23 parts by volume of toluene under a water-separation trap until 0.40 part of water is collected. Evaporate the residual mixture to dryness, and dissolve the residue in 25 parts by volume of dioxane. To the dioxane solution add a solution of 1.1 parts of sodium borohydride in 25 parts by volume of dry ethanol.

After 4 hours at room temperature (20°) evaporate the resulting clear solution to dryness, dissolve the residue in diethylether, water wash the obtained ether solution, dry the washed solution over sodium sulfate and add to the dried product a solution of hydrogen chloride in isopropyl alcohol to precipitate 6.6 parts of the hydrochloride of the title compound.

EXAMPLE 20—METHOD E 2-amino-1,2,6,7,8,12b-hexahydrocyclopenta[d,e]dibenzo[a,d]cyclooctene

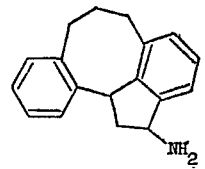

Reflux a mixture of 15 parts of 1,2,6,7,8,12b-hexahydrocyclopenta[d,e]dibenzo[a,d]cycloocten-2-one, 10 parts of hydroxylamine hydrochloride and 25 parts of sodium acetate trihydrate in 850 parts by volume of ethanol for two hours. Dilute the refluxed material with water, and separate from the resultant a quantitative yield of the oxime of the starting cyclooctenone.

Add 10.8 parts of the oxime to a solution of 1 part by volume of acetic acid in 500 parts by volume of ethanol. To the product add, portionwise, 500 parts of 3% sodium amalgam. During the latter additions maintain the obtained medium slightly acidic by the addition thereto of glacial acetic acid.

After all of the amalgam is added (four to five hours), decant supernatant from the mercury, acidify the supernatant with concentrated hydrochloric acid, evaporate the alcohol from the acidified supernatant and adjust the pH of the remaining aqueous solution to 12 with sodium hydroxide. Extract the product with chloroform to obtain crude title compound. Dissolve the thus-extracted crude material in dry diethylether, introduce hydrogen chloride gas into the obtained ether solution to precipitate the hydrochloride of the title compound.

EXAMPLE 21—METHOD F 2-dimethylamino-1,2,6,7,8,12b-hexahydrocyclopenta[d,e]dibenzo[a,d]cyclooctene Heat a mixture of 3.2 parts of 2-amino-1,2,6,7,8, 12b - hexahydrocyclopenta[d,e]dibenzo[a,d]cyclooctene, 2 parts of formic acid and 3 parts of 40% formaldehyde solution under reflux until carbon dioxide evolution ceases. Add an excess of potassium hydroxide solution and extract the resultant product with diethylether. Dissolve the ether extracts in dilute hydrochloric acid and add thereto an excess of sodium nitrite to destroy any primary or secondary amine. Wash the aqueous solution with diethylether; then add a large excess of potassium hydroxide and extract the resultant product with diethylether. Dry the ether solution and introduce hydrochloric acid gas to obtain the title compound.

EXAMPLE 22

2-β-phenethylamino-1,2,6,7,8,12b-hexahydrocyclopenta[d,e]dibenzo[a,d]cyclooctene Shake a mixture of 68 parts of 1,2,6,7,8,12b-hexahydrocyclopenta[d,e]dibenzo[a,d]cycloocten - 2 - one, 100 parts of β-phenethylamine, 80 parts of methanol and 20 parts of Raney nickel catalyst in a hydrogen atmosphere of 1470 p.s.i.g. and maintain the reaction temperature at 140° until hydrogen consumption ceases. Filter the reaction solution and eliminate any unchanged starting material by high vacuum distillation, followed by conversion of the residue to its hydrochloride salt. Recrystallize from wet dioxane to obtain 2-β-phenethylamino-1,2,6,7,8,12b-hexahydrocyclopenta[d,e]dibenzol[a,d]cyclooctene.

Various changes may be made in the substituents on the rings of Compounds I and in the process for the preparation of Compounds I without departing from either the spirit or the scope of the invention or sacrificing its material advantages. The exemplary compounds merely provide illustrative embodiments.

What is claimed is:

1. A compound selected from the group consisting of compounds of the formula

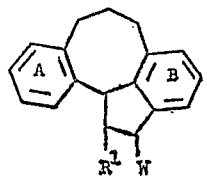

and the non-toxic pharmaceutically acceptable acid addition salts thereof, wherein
$R^1$ represents hydrogen or lower alkyl;
W represents

piperidino, morpholino, 4-methylpiperazino, 4-ethylpiperazino or 4-(β-hydroxyethyl)piperazino;
$R^2$ and $R^3$, independently, represent hydrogen, lower alkyl, allyl, methallyl, propargyl, β-hydroxyethyl, benzyl, p-chlorobenzyl, p-methoxybenzyl, 3,4-methylenedioxybenzyl, phenethyl, p-chlorophenethyl, p-methoxyphenethyl, 3,4 - dimethoxyphenethyl, β - diethylaminoethyl, 1-methylphenethyl, 1-hydroxy-2-butyl or 3-[4-(β-hydroxyethyl)piperazino]propyl;
Ring A is unsubstituted or substituted in at least one of the positions 9, 10 and 11 with at least one substituent of the group chloro, fluoro, lower alkoxy and trifluoromethyl, provided that no two trifluoromethyl groups are ortho to each other; and
Ring B is unsubstituted or substituted in at least one of the positions 3, 4 and 5 with at least one substituent of the group chloro, fluoro, lower alkoxy and trifluoromethyl, provided that no two trifluoromethyl groups are ortho to each other.

2. The compound of claim 1 which is 2-(4-methylpiperazino) - 1,2,6,7,8,12b - hexahydrocyclopenta[d,e]dibenzo[a,d]cyclooctene.

3. The compound of claim 1 which is 2-[4-(β-hydroxyethyl)piperazino] - 1,2,6,7,8,12b - hexahydrocyclopenta[d,e]dibenzo[a,d]cyclooctene.

4. The compound of claim 1 which is 2-morpholino-1,2,6,7,8,12b - hexahydrocyclopenta[d,e]dibenzo[a,d]cyclooctene.

5. The compound of claim 1 which is 2-amino-1,2,6,7,8,12b - hexahydrocyclopenta[d,e]dibenzo[a,d]cyclooctene.

6. A compound of the formula

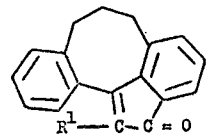

wherein $R^1$ represents hydrogen or lower alkyl.

7. A compound of the formula

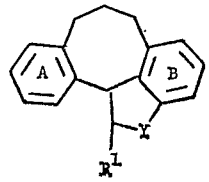

wherein
$R^1$ represents hydrogen or lower alkyl;
Y represents

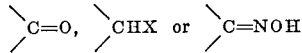

X represents hydroxy, chloro or bromo;
Ring A is unsubstituted or substituted in at least one of the positions 9, 10 and 11 with at least one and no more than two substituents of the group chloro, fluoro, lower alkoxy and trifluoromethyl, provided that no two trifluoromethyl groups are ortho to each other; and
Ring B is unsubstituted or substituted in at least one of the positions 3, 4 and 5 with at least one and no more than two substituents of the group chloro, fluoro, lower alkoxy and trifluoromethyl, provided that no two trifluoromethyl groups are ortho to each other.

8. The compound of claim 7 which is 1,2,6,7,8,12b-hexahydrocyclopenta[d,e]dibenzo[a,d]cycloocten-2-one.

9. The compound of claim 7 which is 1,2,6,7,8,12b-hexahydrocyclopenta[d,e]dibenzo[a,d]cycloocten-2-ol.

10. The compound of claim 7 which is 2-bromo-1,2,6,7,8,12b - hexahydrocyclopenta[d,e]dibenzo[a,d]cyclooctene.

References Cited

Blomquist et al. Chemical Abstracts, vol. 55, p. 7377, (1961).

NICHOLAS S. RIZZO, *Primary Examiner.*

JOSE TOVAR, *Examiner.*